April 2, 1963
L. J. MEYER
3,083,814
CONVEYOR BUCKET CONTROL
Filed Jan. 19, 1962
2 Sheets-Sheet 1
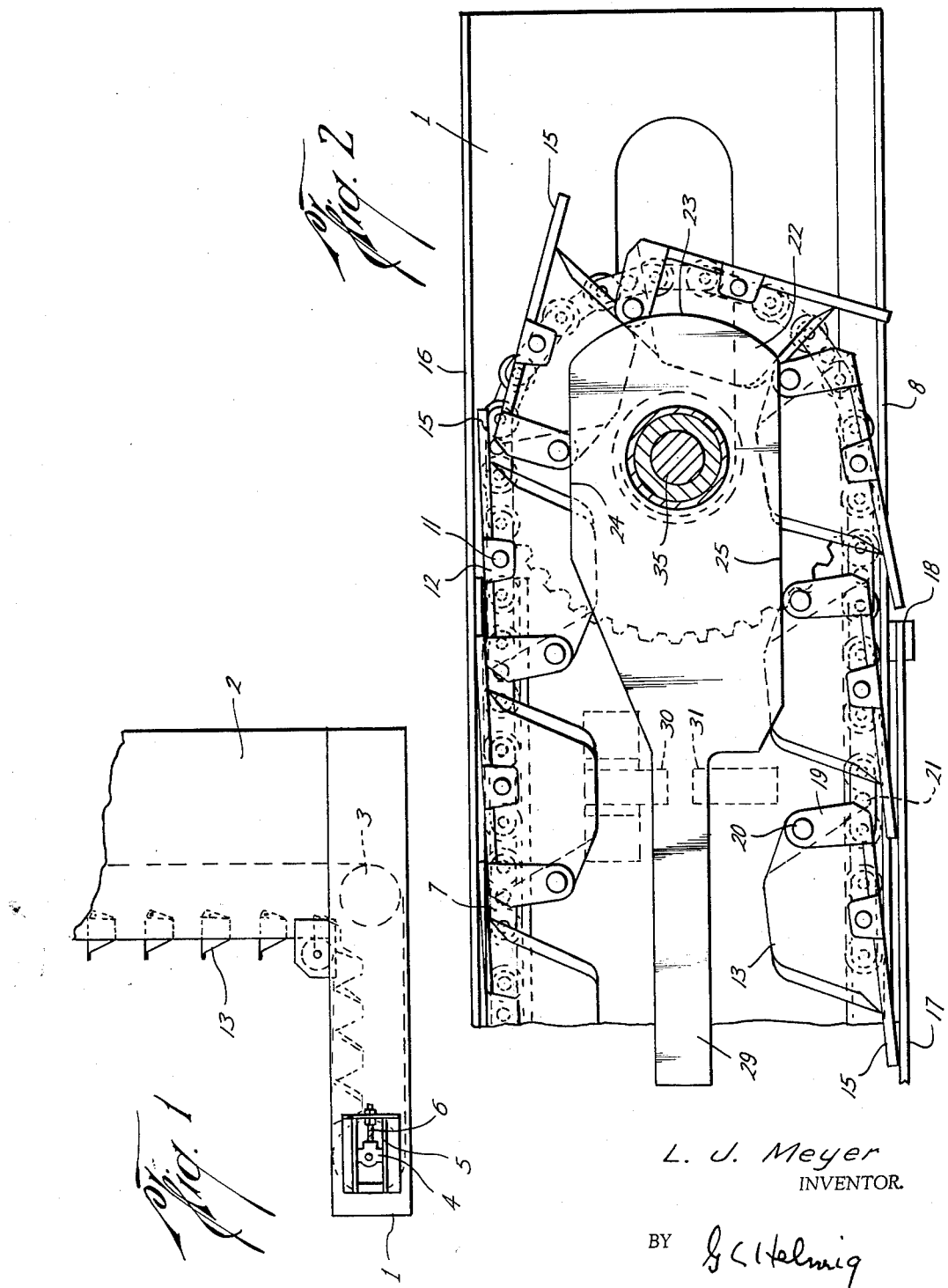
L. J. Meyer
INVENTOR.
BY GC Helmig
ATTORNEY

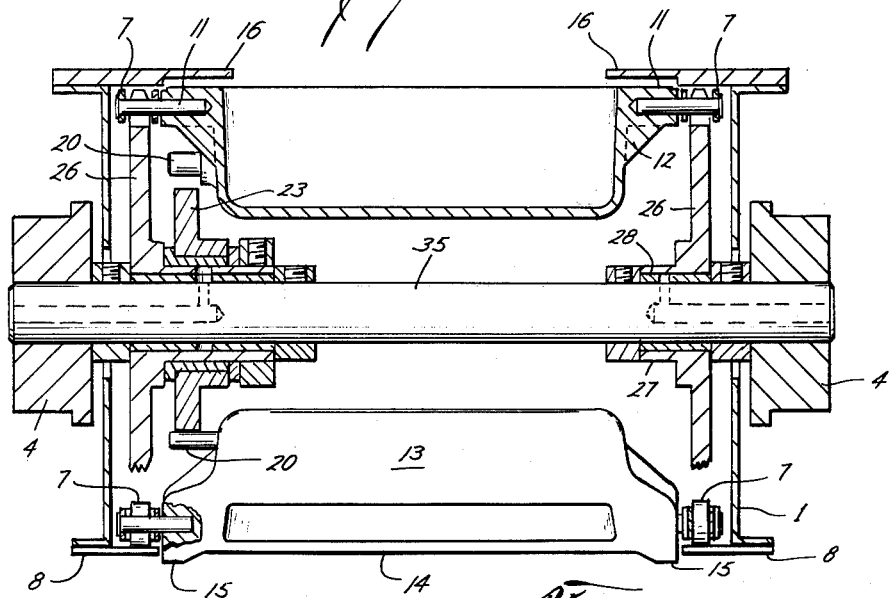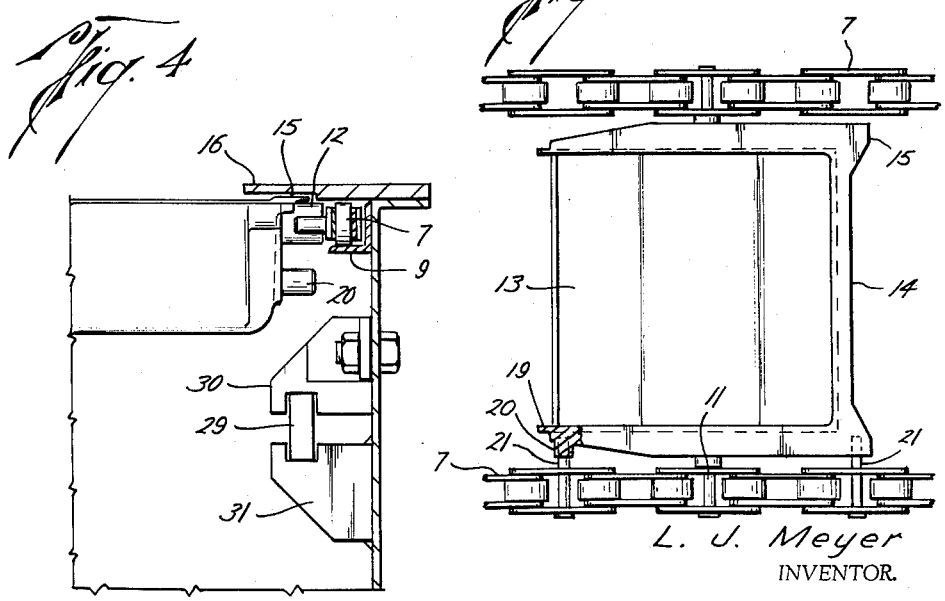

United States Patent Office 3,083,814
Patented Apr. 2, 1963

3,083,814
CONVEYOR BUCKET CONTROL
Leo J. Meyer, % Meyer Machine Co., P.O. Box 5096,
San Antonio, Tex.
Filed Jan. 19, 1962, Ser. No. 167,378
7 Claims. (Cl. 198—145)

This invention relates to bucket conveyor systems of the type employed for transferring materials from one station to another and comprised of a continuous succession of buckets hinged to and drawn by an endless carrier through a loop circuit whose path includes angularly related horizontal and upright reaches as exemplified by my copending patent application Serial No. 850,341, filed November 2, 1959. More particularly, the present invention deals with an improved conveyor structure at a return end of the travel circuit toward which the buckets move upside down and turn with the carrier chain around an end sprocket wheel and into right-side up positions and are so carried away from the turning wheel.

An object of the invention is to provide co-operating bucket abutment stops to limit bucket swing under gravity or other influence during travel through the return loop end of the circuit and in the horizontal portions of the path leading to and from the turn so that closely coupled buckets are maintained against displacement and malfunctioning damage as might otherwise result from misalignment and jamming of the closely adjacent buckets and which bucket abutment stops are arranged as to be ineffective against gravity action for holding loaded buckets right side up as they pass out of a horizontal travel path at the loading station and through an elevating reach of the circuit.

A further object of the invention is to provide a bucket positioning control plate having shaped marginal guideways engageable by buckets moving through a loop turn and being mounted relative to the chain circuit wheel so as to partake of linear movement of the wheel as the wheel is shifted in a chain slack take-up adjustment whereby bucket guide action of the control plate is unvaried in all position settings of the sprocket wheel.

Another object is to provide a bearing connection between the bucket positioning control plate and its adjacent sprocket wheel assembly which accommodates wheel rotation and also supports and holds the control plate against radial displacement relative to the wheel axis and transmits to the plate the linear motion of the wheel during a slack take-up adjustment, together with an additional bearing and guide for the control plate and which locates the plate against angular displacement about the wheel axis while accommodating linear slide travel with the wheel.

Other objects and advantages will appear during the course of the following specification having reference to the accompanying drawings wherein FIG. 1 is a side elevation of a fragment of a continuous bucket conveyor elevator structure; FIG. 2 is an enlarged side elevation with parts in section of the operating mechanism in the bottom leg of the elevator structure shown in FIG. 1 and as viewed from the side opposite that seen in FIG. 1; FIG. 3 is a vertical sectional view through the sprocket wheel and shaft assembly as viewed toward the left of FIG. 2 and with the loading buckets displaced longitudinally from the positions shown in FIG. 2; FIG. 4 is a vertical sectional view showing part of the mechanism as viewed at the left-hand end of FIG. 2 and FIG. 5 is a detail plan view of one of the buckets hingedly suspended by and between a pair of roller chain carriers.

As in the case of my previously mentioned patent application, the endless chain loop circuit may be of substantially Z-shaped outline in which the lower horizontal leg is at a loading station and is joined by the riser or vertical portion of the machine with the top horizontal leg at an unloading station. The general arrangement being conventional and for purposes of simplification, FIG. 1 omits the upper end of the conveyor structure and more or less diagrammatically illustrates the operating mechanism at the lower leg 1 and in a portion of the elevator riser portion 2. The buckets in close succession and pivotally suspended between a pair of endless chains, move in upright position through the loading station where they are filled and as the chain turns into the vertical portion of its reach the hinged buckets will swing relative to the chain so as to remain in upright position. At each turn in the direction of chain travel, a suitable set of sprocket wheels guide the chain and in the reaches between the sprocket wheels the rollers of the chain will ride or be guided by suitable trackways. One of the sprockets, as, for example, that shown at 3, will have a drive transmission connection with a suitable motor and the opposite shaft ends of the loop end sprocket wheels will be mounted in bearing blocks slidably supported between a pair of guide rails 5 for linear movement as controlled by a jack screw 6. Jack screw adjustment at the time of initial assembly will set the position of the loop end sprockets for tensioning or taking out excess looseness in the chain loops and subsequent wear or stress on the chain parts and any subsequent slack due to wear of the chain parts will be taken up by a resetting of the bearing blocks 4 and the sprocket wheel assembly by readjustment of the jack screw 6.

The two transversely spaced apart carrier chains indicated at 7 are of standard design comprising successive pairs of interfitted links with an antifriction roller mounted on the connecting pins. Such rollers can ride on supporting trackways throughout various regions of the loop circuit one of which is shown at 8 in FIG. 2 in the path of chain travel toward the return end of the loop circuit. Another such track is shown at 9 in FIG. 2 for supporting the chain as it travels beyond the turn. The start of the track 9 is shown at 10 in slightly spaced relation with the point at which the chain disengages from the sprocket wheel.

As here shown, every fifth set of chain links supports medially of the length thereof an inwardly extended pivot pin 11 and those pins of one chain are in transverse alignment with like pins of the other chain of the pair. Each pair of aligned pins 11 projects into socketed bosses on the opposite side walls of a bucket 13 and which bosses are near the upper open end of the bucket and approximately midway between the leading and trailing ends of the bucket so that the bucket is pivotally suspended from the chain and normally tends to hang below the pivot axis.

Each bucket has downwardly convergent side walls and its upper leading edge in any horizontal reach is closely adjacent the trailing edge of a preceding bucket and provides a minimum of clearance between adjoining buckets. Such clearance is necessary, particularly in the travel of the buckets through turns, and the convergently related side walls of the bucket insure adequate clearance between adjoining buckets when any bucket swings relative to its neighboring bucket.

At the top of each bucket and along the side walls thereof, there are provided outwardly extending horizontal flanges which merge rearwardly into a rearwardly extending flange or lip 14 which projects for a distance to overlie and therefore provide an abutment surface for the leading edge of the next succeeding bucket and which is effective in the horizontal travel paths of the bucket. Since the lip 14 overhangs the intervening clearance space between buckets, it serves, along with its co-operating side flanges, to minimize fall-through of material dropping into the buckets at the loading station. In addition, the rearwardly extending lip 14 has short tailpieces projecting rearwardly therefrom along each side of the bucket and these tailpieces are arranged to have sliding abutment with guideways in the horizontal reaches of the travel path. One such trackway is indicated at 16 in FIG. 2 in the reach leading from the turn and another trackway 17 is shown leading toward the turn and terminating at 18 just ahead of the point at which the turn begins. In the case of the trackway 16, it will be noted in FIG. 2 that as each bucket leaves the turn the tailpieces 15 will tend to come into sliding abutment with the trackway 16 and in any event, any swing movement of the bucket in a counterclockwise direction, as viewed in FIG. 2, will be limited by such sliding abutment. It will be noted furthermore that as each bucket moves toward the end of the turn, its leading edge will underlie the lip 14 of the preceding bucket and that abutment will limit swing in a direction clockwise, as viewed in FIG. 2. In the case of the upended buckets which are moving toward the turn in the lower horizontal reach, the distribution of weight of the empty bucket in relation to its pivot axis will tend to bias the bucket in a counterclockwise direction, as viewed in FIG. 2, and the trailing tailpieces 15 will ride on the guideway 17 to a terminal edge 18.

The near side wall of each bucket, as seen in FIG. 2, has a forward extension at 19 which carries a laterally projecting boss 20 in given spaced relation to the pivot pin 11 and at some distance below the open top of the bucket for co-operation with this pin. To limit bucket swing in a clockwise direction, as viewed in FIG. 2, there is carried by the chain in the path of the boss 20 a stop abutment pin 21. This abutment boss 20 also serves to limit counterclockwise direction of the buckets in the region of the turn and in the interval of travel after the tailpieces 15 drop from the track 17 beyond its terminal end 18 and until the buckets have left the turn and entered the upper horizontal reach in which the tailpieces 15 can engages the trackway 16 to position the buckets against counterclockwise rotation. For co-operation with the abutment boss 20 in this interval, there is here provided a longitudinally extending position control plate 22 disposed in a vertical plane and having a curved edge 23 at one end which is concentric to the turning path of the chain and also having upper and lower edges 24 and 25 in substantial parallelism with the trackways 16 and 17 respectively. As the bucket proceeds into the turn and leaves the trackway 17, it normally will swing around its pivot mounting until the abutment boss 20 rides along the marginal edge guide 25 of the control plate and then will follow the curved edge 23 as the bucket moves through the turning path and finally rides off of the curved edge and onto the top straight edge 24 for a distance which will bring the trailing tails into co-operative relation with the trackway 16. If during this portion of the travel path the buckets should be forced outwardly, they can swing in the clockwise direction as viewed in FIG. 2 for only the distance which brings the boss 20 into abutment with the chain carried pin 21 adjacent thereto.

Centrally of the position locating guide margins of the control plate is an aperture to receive the sprocket wheel and shaft assembly and by which the plate is connected to the rotating sprocket assembly. This assembly includes a transverse shaft 35 mounted in the slide bearing blocks 4 and carrying a pair of sprocket wheels 26, one for each of the chains 7. The tubular portion 27 surrounding the aperture in the plate 22 is fitted to a bearing sleeve 28 on the hub of an adjacent sprocket 26 to allow relative rotation and to carry the control plate 22 along with the sprocket wheel assembly in the linear direction of the bearing blocks 4 to any position of slack take-up adjustment. For further support of the control plate 22 and to accommodate such linear movement but otherwise locate the plate, the end of the plate opposite to the curved guide edge 23 is constituted by a narrow tailpiece 29 slidably positioned between a pair of top and bottom blocks 30 and 31 while they are welded or adjustably bolted to the side frame of the machine.

The relation of the parts as seen in FIG. 2 is substantially that which would prevail at one end of the range of slack take-up adjustment and the shape and length of the top and bottom guide edges 24 and 25 are such that they will afford effective control of the buckets in all relative positions of slack take-up adjustment. In other words, a portion of the guiding edge 25 is shown as extending beyond the end 18 and into overlapping relation with the trackway 17 but upon projection of the plate 22 to the opposite end of the range of slack take-up adjustment, the edge 25 will move beyond the end 18 of the trackway 17 but will still be in position to be engaged by the boss 20 immediately any bucket leaves the track 17. Similarly, the upper edge 24 will always be effective to position the bucket against excessive counterclockwise swing until such time as the tailpieces 15 approach abutment engagement with the trackway 16 and for the chain rollers to pass onto the track 9 and beyond the track end 10.

If desired, the control plate 22 and the co-operating boss 20 and pin 21 can be duplicated on both sides of the bucket but in most instances bucket position will be adequately controlled from one side only of the path of travel of the buckets. The limits provided to control bucket position in the horizontal reaches of the circuit will not be required when the loaded buckets pass into and move upwardly in the riser portion of the path and there will be no interference to the swinging of the buckets into a continuing upright position as the path of the chain moves vertically.

While but one simple and inexpensive but wholly reliable form of the invention has been described in detail, it will be understood that such modifications can be made as come within the scope of the appended claims.

What is claimed is:

1. In a traveling bucket conveyor system, a succession of buckets, a traveling chain pivotally supporting the buckets for travel therewith, a chain engaging sprocket wheel and mounting shaft assembly guiding the chain through a turn in the direction of chain travel, adjustable shaft bearing means enabling sprocket position to be shifted in a direction transverse to its rotational axis and for control of chain slack, a bucket positioning guide member having connection with said assembly for unisonal movement therewith in the direction of adjustment, locating means engaging said member and accommodating such movement while holding the member against displacement otherwise, a bucket tracking surface on the member extending adjacent the path of the buckets through said turn with chain travel and an abutment element carried by each bucket in radially spaced relation to the pivot support of the bucket for riding on the tracking surface of the member as a limit to bucket swing about its pivot during bucket travel through said turn.

2. In a traveling bucket conveyor system as in claim 1, an abutment stop carried by the chain adjacent each pivoted bucket and engageable by the bucket as a limit to swing in a direction away from said tracking surface.

3. In a traveling bucket conveyor system having a bucket travel path containing a turn, a pair of transversely spaced apart guide wheels in said turn, a pair of bucket supporting and drive transmitting elements entrained on and guided by said wheels through the turn and extended in paths to and from the turn, a succession of open top buckets each pivotally suspended near its open top within the transverse space between and on a transverse axis by said elements with the bucket leading end closely adjacent the trailing end of a preceding bucket, a rearward lip projected from the trailing end of each bucket in overlapping engageable relation with a leading end of the next succeeding bucket, a first guide trackway adjacent the path of travel away from said turn for slidable engagement by said rearward lip to locate the bucket upright after travel through said turn, a second guide trackway adjacent the path of travel toward said turn for slidable engagement by said rearward lip to locate the bucket upside down in advance of travel through said turn, means mounting said guide wheels for movement in a linear direction transverse to their axis for adjustably setting slack in said element, a bucket engageable and position control plate adjacent one of said guide wheels and shiftable therewith in said linear direction, a guide surface on said control plate of a length and shape in relation to all settings of the wheels as to be engaged by a portion of each bucket as it travels beyond lip engagement with the second trackway and into lip engagement with the first trackway through said turn and from upside down relation to upright relation.

4. In a traveling bucket conveyor as in claim 3 wherein said control plate is guided for movement with the wheel in the linear direction and for free relative wheel rotation together with locating slide bearings engageable with a portion of the control plate and accommodating such unisonal movement while resisting plate displacement in other directions.

5. In a traveling bucket conveyor as in claim 3 wherein said guide surface on the control plate is constituted by plate margins which at one end of the plate extend on a line of curvature substantially concentric with the adjacent guide wheel and intersect at opposite ends with plate marginal portions projected therefrom in substantial parallelism, one with the first trackway and the other with the second trackway, said control plate having an opening therethrough centrally related to such margins and fitted to a rotational bearing surface on the adjacent wheel, a tailpiece projecting from the control plate at its opposite end and a pair of tailpiece engageable guide bearings slidably receiving the tailpiece therebetween.

6. In a traveling conveyor, a drive chain, a sprocket guide wheel assembly therefor to guide the chain through a turn, means adjustably positioning the wheel assembly, a succession of buckets pivotally carried by the chain and each provided with a projecting lip for stop abutment engagement with a neighboring bucket and also provided with a lateral stop abutment boss radially spaced from the bucket pivot, lip engageable trackways fixedly mounted adjacent the path of the chain and active in their effective length to position the buckets for limited swing action and means supplementing the action of the trackways in the region of their travel through the turn and in all positions of wheel assembly adjustment and comprising a control plate having a rotary bearing fit on the wheel assembly whereby to partake of wheel adjustment movement and having one end projected between the trackways and its opposite end extended toward the turning path of the chain and presenting a curved edge substantially concentric with the wheel assembly and with co-operating edges on opposite sides of said bearing for engagement by said lateral stop abutment boss and plate locating means engaging said one end and co-operating with said bearing in positioning the control plate and also accommodating plate movement with the wheel assembly.

7. In a bucket conveyor system, a traveling chain, a guide sprocket wheel on which the chain is entrained at a turn between paths leading to and from the sprocket wheel, a succession of buckets pivotally suspended by the chain and means to restrict swinging of the buckets about their pivots and including a lip projected rearwardly from each bucket for overlapping abutment engaging relation with the leading edge of the next succeeding bucket, a stop abutment pin carried by the chain between the trailing edge of each bucket and the leading edge of the next succeeding bucket and in underlying relation to the lip of the preceding bucket for abutment therewith to limit bucket swing in one direction, an abutment boss carried at the leading edge of each bucket in position to engage the adjoining chain carried abutment pin upon bucket swing in said one direction, a first guide trackway positioned adjacent the path leading to the turn and arranged for engagement by lips of buckets adjoining the trackway to limit bucket swing in the other direction, a second trackway positioned adjacent the path leading from the turn and engageable by lips of buckets adjacent the second trackway to limit bucket swing in said other direction and a control plate having a boss abutment edge throughout a region extended through said turn and engageable by bosses of buckets adjacent thereto to limit bucket swing in said other direction.

No references cited.